Nov. 4, 1952     R. L. ANDERSON     2,616,433
CONCAVE-ADJUSTING MEANS FOR THRESHERS
Filed July 8, 1949     2 SHEETS—SHEET 1

INVENTOR.
R. L. ANDERSON
BY
ATTORNEYS

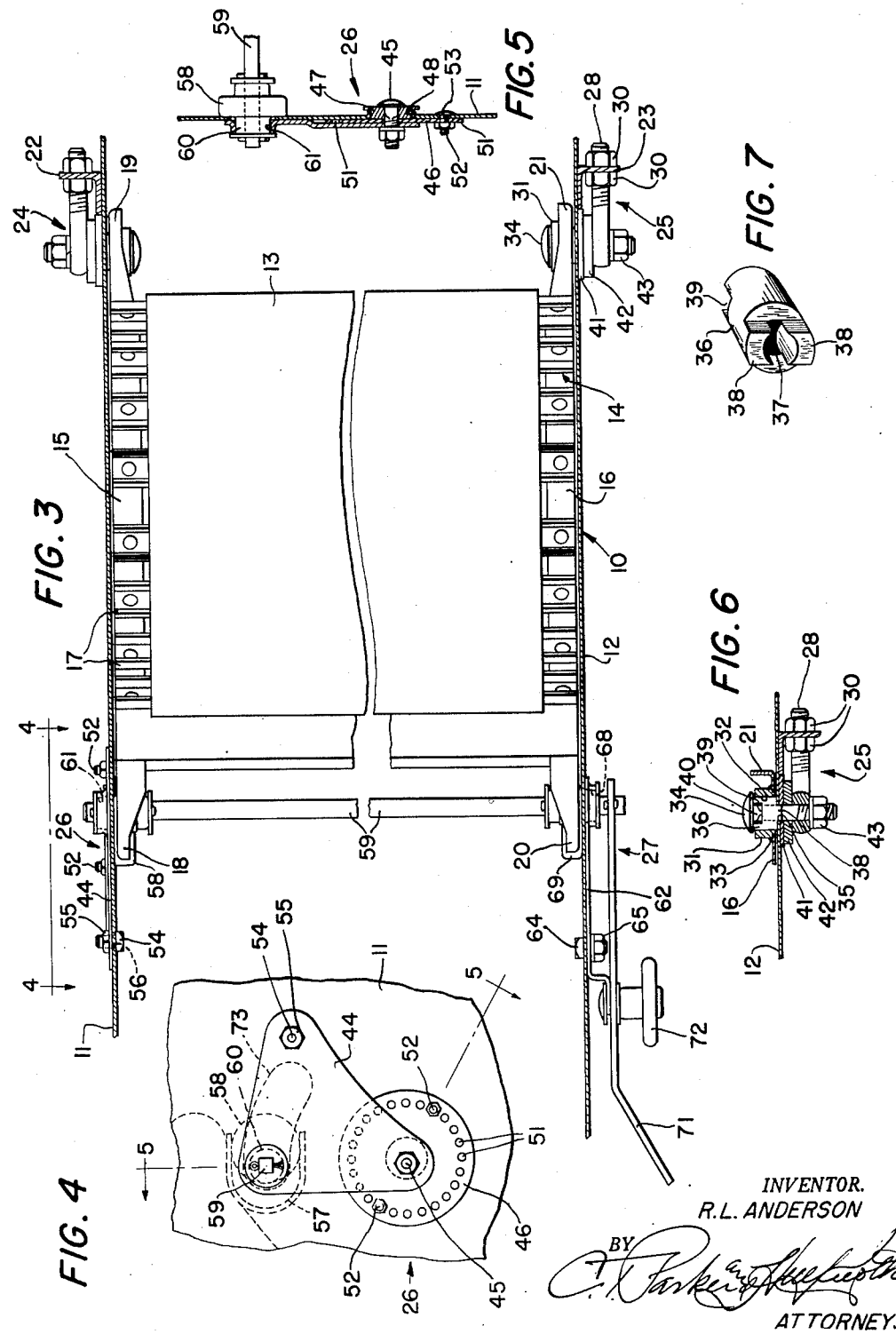

Patented Nov. 4, 1952

2,616,433

UNITED STATES PATENT OFFICE 2,616,433

CONCAVE-ADJUSTING MEANS FOR THRESHERS

Ralph L. Anderson, East Moline, Ill., assignor to Deere & Company, Moline, Ill., a corporation of Illinois Application July 8, 1949, Serial No. 103,645

6 Claims. (Cl. 130—27)

This invention relates to a thresher and more particularly to an adjustable concave construction for the thresher cylinder.

The conventional thresher comprises a thresher body which forms a housing within which a threshing cylinder is rotatably carried. The threshing cylinder cooperates with a concave below the cylinder, and grain to be threshed is fed between the lower surface of the cylinder and the upper surface of the concave. The concave must be adjusted relative to the cylinder to accommodate grains of different types. In addition to the adjustability of the concave toward or away from the cylinder, it is important that the concave be level with respect to the cylinder so that the threshing action will be uniform.

According to the present invention, it is a principal object to provide improved mounting means for the concave, with means including provision for adjustment of the concave both vertically and fore and aft with respect to the threshing cylinder. The adjustable mounting further includes provision for leveling the concave with respect to the cylinder.

An important object of the invention is to provide the adjusting means in such manner that it may be swung to a released position to permit the concave to be dropped away from the cylinder so that ready access may be had to the space between the cylinder and concave in the event that the threshing mechanism becomes clogged. It is a feature of the invention in this respect that the release of the concave by the adjusting means can be accomplished without affecting the adjusted position of the adjusting means.

The foregoing and other important objects and desirable features inherent in and encompassed by the invention will become apparent to those versed in the art as the disclosure of a preferred embodiment of the invention is fully made in the following detailed description and accompanying sheets of drawings in which:

Figure 3 is a plan view of the structure shown in Figure 1;

Figure 4 is a fragmentary side elevational view of the forward mounting at one side of the concave, the view being taken generally along the line 4—4 of Figure 3;

Figure 5 is a sectional view taken on the line 5—5 of Figure 4;

Figure 6 is a sectional view taken on the line 6—6 of Figure 2 and showing one of the rear mounting means; and Figure 7 is a perspective view of one of the elements of one of the rear adjusting means.

Figure 1:
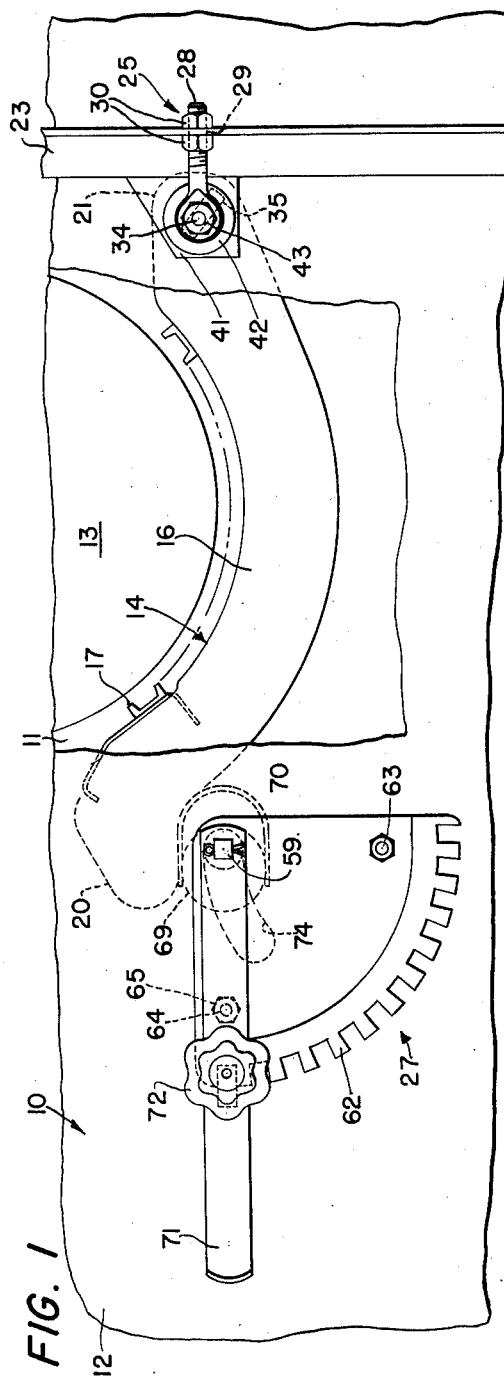
Figure 1 is a side elevational view, with portions of the thresher body broken away, showing the mounting of the concave.

The following description will pertain to a preferred embodiment of the invention that has been found to operate satisfactorily in all respects. It is immaterial, in so far as the present invention is concerned, whether the invention be utilized in a stationary thresher or in a thresher that forms part of a combine. For the purposes of simplicity and clarity, the various parts will be referred to as having front and rear ends and top and bottom portions. It will be understood, of course, that the parts may be arranged and proportioned other than as illustrated and described. Therefore, the present disclosure should be taken as illustrative and not limiting.

The numeral 10 designates generally a body or thresher housing comprising a pair of fore and aft extending, transversely spaced apart side walls or sheets 11 and 12, these sheets providing the main components of the housing within which is carried a thresher cylinder 13. The cylinder in the present case is shown only generally and may be of any conventional construction and may have any suitable bearings for the carrying thereof for rotation on a transverse horizontal axis.

There is positioned below the cylinder 13 and for cooperation therewith a thresher concave designated generally by the numeral 14. The particular concave illustrated is made up of a pair of transversely spaced apart, fore and aft extending side members 15 and 16 which lie respectively inside the side sheets 11 and 12. The side members 15 and 16 are cross-connected by a plurality of bars 17, the construction in this respect following generally conventional designs.

The concave side member 15 has front and rear mounting portions or elements 18 and 19, respectively. The other side member is provided with front and rear mounting elements or portions 20 and 21. A pair of vertical angle members run respectively along the side sheets 11 and 12, as designated respectively by the numerals 22 and 23 in Figure 3. The concave is mounted at its rear end mounting elements 19 and 21 by a pair of transversely spaced apart and alined mounting means 24 and 25, respectively, the details of which will be set forth below. The front ends 18 and 20 of the concave are mounted on the body by a pair of transversely spaced apart and alined mounting means 26 and 27, respectively, the details of which will likewise be described below.

Since each of the means for mounting the rear ends 19 and 21 of the concave are identical, only the means 25 will be described, it being understood that the means 24 has similar parts. The means 25 comprises a first element in the form of an eyebolt 28 which is received in a horizontal aperture 29 formed in the outwardly extending flange of the angle member 23. The threaded portion of the eyebolt 28 receives at each side of the flange of the angle member 23 a nut 30. These nuts cooperate with the flange to provide elements cooperative with the eyebolt to effect fore and aft adjustment of the eyebolt.

Figure 2:
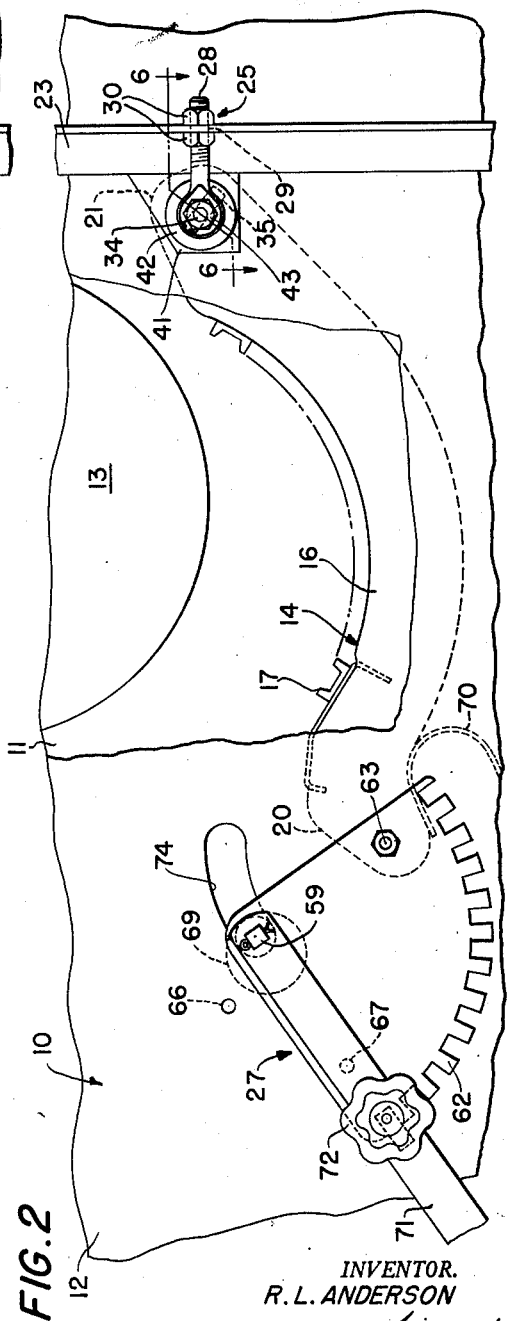
Figure 2 is a view similar to Figure 1, but showing the adjusting means at one end of the concave moved to its released position so that the concave may be dropped.

Figure 6 shows that the rear end 21 of the concave side member 16 is L-shaped in cross-section and is fitted with a collar member 31 which is apertured or bored at 32 on a transverse horizontal axis. The collar is welded to the side member 16 as indicated at 33 in Figure 6. The concave is mounted with the bore 32 in axial alinement with the opening in the eyebolt 28 and adjustable securing means in the form of a carriage bolt 34 is passed through the alined apertures and through a slot 35 in the proximate side sheet 12. The slot 35, as best shown in Figures 1 and 2, is elongated and inclined upwardly and forwardly. A bushing 36 (Figure 7) is apertured at 37 to receive that portion of the bolt 34 adjacent its head. This bushing is provided at one end with diametrically arranged key means 38 which are separated by the bore 37 and which fit into the slot 35. The other end of the bushing is provided with a diametrical slot or groove 39 into which fits a key or tongue portion 40 formed at the headed end of the bolt 34 (Figure 6). The bushing 36 is thus non-rotatable with respect to the bolt and side sheets, yet is slidable lengthwise of the angled slot 35. Washers 41 and 42 are interposed between the outside of the side sheet 12 and the inner face of the eyebolt 28. A nut 43 is threaded onto the outwardly projecting end of the bolt 34 and completes the adjustable means comprising the elements 34, 36 and 43.

From the description thus far it will be seen that the eyebolts at both sides of the body 10 may be independently adjusted to shift the concave fore and aft. Likewise, each end 19, 21 may be adjusted generally vertically independently of or simultaneously with the other, the means 25 including the angled slot 35 and the parts cooperative therewith and the means 24 including similar cooperating elements. Hence, either side of the rear end of the concave has a combination adjustment with respect to the cylinder 13.

The adjusting means 26 for the forward end portion or element 18 at the side 15 of the concave 14 includes a supporting member or plate 44 which is mounted at the outer face of the side sheet 11 by means including a pivot bolt 45. This bolt passes through a centrally apertured adjusting element in the form of a disk 46 (Figures 4 and 5) and through an apertured bushing 47 that is welded or otherwise secured to the disk. The bushing 47 is rotatable in a flanged aperture 48 (Figure 5) formed in the side sheet 11. The axis of the pivot bolt 45 is offset or eccentric with respect to the coaxial centers of the aperture 48 and disk 46, so that rotation of the disk 46 and bushing 47 can be utilized to adjust the position of the supporting member or plate 44, the primary purpose of the adjustment being to effect different vertical positions of the plate 44 for accomplishing leveling of the concave 14, as will appear in greater detail below. The disk 46 is provided with a plurality of angularly spaced apertures 51, diametrical pairs of which are selectively cooperative with securing means in the form of bolts 52 carried respectively by a pair of apertures 53 in the side sheet 11 (Figure 5).

The supporting member or plate 44 is normally fixed in the position shown in Figure 4, or in any adjusted position comparable thereto, by releasable means including a bolt 54 and nut 55, the bolt passing through a suitable aperture 56 in the side sheet 11 (Figure 3). The nut 55 may be removed from the bolt 54 and the bolt removed from the side sheet 11 and member 44 so that the member 44 may swing forwardly about the bolt 45 as a pivot axis. Normally, however, the bolt 54 is placed as illustrated in Figures 3 and 4.

The forward end 18 of the concave side member 15 provides a mounting element which is in the form of a forwardly opening, elongated pocket 57. The supporting member 44 carries adjusting means in the form of an eccentric 58 that is received by the pocket 57. This eccentric is fixed on a transverse square shaft 59 which is journaled at one end in a bushing 60 in an upper portion of the supporting member 44, the bushing preferably forming an integral part of the eccentric 58 and the upper portion of the member 44 having a flanged aperture 61 for receiving the bushing (Figure 5). The bearing or bushing 60, the adjustable pivot means 45—48, and the removable pivot means 54—55 thus provide the plate with first, second and third triangularly arranged portions.

It will be seen from the description thus far that rocking of the rockshaft 59 will effect vertical adjustment of the forward ends of the concave by virtue of the engagement or relationship between the eccentric 58 and pocket or mounting element 57. The relationship of this adjustment to the other adjustments provided for the concave will appear as the description progresses.

The other side sheet 12 has means for carrying a second supporting member or plate 62. This means includes a pivot provided by a pivot bolt 63 which is very similar to and for the same purpose as the pivot bolt 45, except that the pivot 63 is not adjustable as is the pivot 45. The member or plate 62 is in the form of a toothed sector and is normally fixed in the position of Figure 1 by releasable means including a bolt 64 and a nut 65. The bolt 64 passes through an aperture 66 in the side sheet 12 (Figure 2) and through a normally alined aperture 67 (also Figure 2) in the sector or plate 62. When the bolt 64 and nut 65 are in place the sector 62 occupies the position shown in Figure 1; when the bolt 64 is removed, the sector 62 may swing to the position of Figure 2, the axis of swinging being at 63.

The upper portion or apex of the plate or sector 62 has a flanged aperture 68 which rotatably carries a second adjusting means in the form of an eccentric 69. This eccentric is similar to the eccentric 58 and is fixed to the proximate end of the transverse rockshaft 59, this rockshaft serving as means for interconnecting the two eccentrics for simultaneous operation. The eccentric 69 cooperates with the mounting element 20 on which is provided a forwardly opening and elongated pocket 70.

The rockshaft 59 projects past the flanged aperture or bearing 68 and has fixed thereto one end of an adjusting lever 71. This lever may be fixed in selected positions of adjustment with respect to the sector 62 by means including a releasable hand nut 72 and selected notches in the sector. When the two supporting members or plates 44 and 62 are fixed in the positions of Figures 1 and 4, the lever 71 may be utilized to rock the rockshaft 59 and simultaneously to rock the eccentrics 58 and 69, thus raising or lowering the forward ends of the concave about the rear mounting means 24 and 25, these latter means providing a pivot or hinge axis for that purpose. In the event that the threshing cylinder and concave become clogged, the front adjusting means 26 and 27 may release the concave without affecting the adjustment accomplished by the eccentrics 58 and 69. This release is effected by removal of the bolts and nuts 54, 55 and 64, 65, so that the supporting members or plates 44 and 62 may be swung forwardly, thus disengaging the eccentrics 58 and 69 respectively from the pockets 67 and 70 at the front ends of the concave. The concave may then be dropped, swinging about the rear mounting means 24, 25 as a hinge axis, a result that will be apparent from an examination of Figure 2.

The side sheet 11 is provided with an elongated arcuate slot 73 (Figure 4) formed generally about the axis at 45 and within which the eccentric and bushing 60 may shift fore and aft as the member 44 pivots about 45. The other side sheet 12 has a similar slot 74 (Figures 1 and 2) for a similar purpose with respect to the eccentric 69. These slots serve as means for limiting forward travel of the movable parts of the adjusting means 26 and 27 as they assume released positions.

The fore and aft elongation of the pockets 57 and 70 permits fore and aft adjustment of the concave by either or both of the means 24 and 25. The means 26 provides for leveling of the front ends of the concave, since the disk 46 may adjust the vertical relationship of the pivot 45 to the cylinder, thus adjusting one side of the front end of the concave with respect to the other. The several adjusting means may be interrelated to accomplish any desired adjustment within a wide range. The important feature is that the means 26 and 27 may be released to allow the concave to be dropped for cleaning purposes, all without affecting the adjustment previously accomplished. Hence, the concave, after being cleared, can be returned to its original adjusted position.

Various other features of the invention not enumerated above will undoubtedly occur to those versed in the art, as likewise will numerous modifications and alterations of the preferred embodiment of the invention illustrated, all of which may be achieved without departing from the spirit and scope of the invention as set forth in the appended claims.

What is claimed is:

1. In threshing mechanism having a fore and aft extending body including a threshing cylinder rotatable about a transverse horizontal axis, the improvement comprising: a concave positioned below the cylinder and having front and rear ends; means on the rear end of the concave and engaging the body for mounting the concave for swinging toward or away from the cylinder; pocket means providing a forwardly opening pocket at the front end of the concave; a supporting member carried by the body on a transverse horizontal axis spaced vertically from the front end of the concave for swinging forwardly away from a pocket-proximate position to a remote position clear of the pocket; rockable eccentric means carried by the supporting member and engageable, when the supporting member is in its pocket-proximate position, with the pocket for effecting adjustment of the concave toward or away from the cylinder; and means engageable between the body and the supporting member for fixing the supporting member in its pocket-proximate position, said means including releasable elements providing for forward swinging of the supporting member to its remote position to disengage the eccentric means from the pocket so that the concave may be swung downwardly about its rear mounting means.

2. The invention defined in claim 1, further characterized in that: the pocket means include a second pocket transversely spaced from and alined with the aforesaid pocket and also opening forwardly; the eccentric means comprises a transverse rockshaft and eccentrics at opposite ends thereof respectively cooperative with the pockets; the aforesaid supporting member is adjacent one of said eccentrics; a second supporting member is disposed adjacent the other eccentric; and means engages between the body and the second supporting member for adjusting the second supporting member relative to the body and relative to the other supporting member.

3. In threshing mechanism having a fore and aft extending body including a threshing cylinder rotatable about a transverse horizontal axis, the improvement comprising: a concave positioned below the cylinder and having front and rear ends; means on the rear end of the concave and engaging the body for mounting the concave for swinging toward or away from the cylinder; mounting means at the front end of the concave; a supporting member carried by the body for shifting between a first position proximate to the front mounting means and a second position remote from the front mounting means; adjusting means carried by the supporting member and engageable, when the supporting member is in its first position, with the front mounting means, said adjusting means being movable relative to the supporting member and operative independently of shifting of the supporting member for effecting adjustment of the concave toward or away from the cylinder; and means engageable between the body and the supporting member in its first position, said means including releasable elements providing for shifting of the supporting member to its second position to disengage the adjusting means from the front mounting means so that the concave may be swung downwardly about its rear mounting means.

4. The invention defined in claim 3, further characterized in that: the front mounting means includes a pair of transversely spaced and alined mounting elements; the adjusting means comprises a transverse member and adjusting portions at opposite ends thereof respectively cooperative with the mounting elements; the aforesaid supporting member is adjacent one of said adjusting portions; a second supporting member is disposed adjacent the other adjusting portion; and adjusting means is provided on the second supporting member including a selectively positionable member cooperative with the body and second supporting member for adjusting the second supporting member relative to the body and relative to the other supporting member.

5. In threshing mechanism having a fore and aft extending body including a threshing cylinder rotatable about a transverse horizontal axis, the improvement comprising: a concave positioned below the cylinder and having front and rear ends; means on the rear end of the concave for mounting the concave for swinging toward or away from the cylinder; pocket means providing a forwardly opening pocket on and at the front end of the concave; a sector positioned with its apex substantially coincident with the pocket means and having an arcuate toothed portion formed generally about said apex; pivot means on a transverse axis spaced from said apex and connecting the sector to the body; angularly movable eccentric means carried at the apex of the sector for rocking about a transverse axis to raise or lower the concave; a lever connected to the eccentric means and having a portion selectively engageable with the tooth portion of the sector to fix the position of the lever and eccentric means; and releasable means normally holding the sector in position but releasable to provide for swinging of the sector, lever and eccentric means about the sector pivot means to release the eccentric means from the pocket means of the concave.

6. In threshing mechanism having a fore and aft extending body including a threshing cylinder rotatable about a transverse horizontal axis, the improvement comprising: a concave positioned below the cylinder and having front and rear ends; means on the rear end of the concave for mounting the concave for swinging toward or away from the cylinder; pocket means providing a forwardly opening pocket on and at the front end of the concave; a support having first, second and third triangularly arranged portions and positioned adjacent the front end of the concave with the first portion proximate to the concave pocket means, the second portion spaced vertically relative to the pocket means, and the third portion spaced fore and aft relative to the pocket means; concave-adjusting means carried by the first portion releasably engaging the pocket means and operative when engaged to adjust the concave toward or away from the cylinder; first pivot means connecting the support at its second portion to the body for movement of the support optionally toward or away from the body to selectively effect respectively engagement or disengagement between the adjusting means and the pocket means; second pivot means detachably connecting the support at its third portion to the body for selectively holding or releasing the support as respects movement about the first pivot; and means included in the first pivot means for adjusting the support vertically about the second pivot means to raise or lower the concave-adjusting means.

RALPH L. ANDERSON.

REFERENCES CITED

The following references are of record in the file of this patent:

UNITED STATES PATENTS

| Number | Name | Date |
|---|---|---|
| 567,117 | Campbell et al. | Sept. 1, 1896 |
| 685,107 | Clay | Oct. 22, 1901 |
| 753,032 | Bankey | Feb. 23, 1904 |
| 2,234,078 | Hunt | Mar. 4, 1941 |

FOREIGN PATENTS

| Number | Country | Date |
|---|---|---|
| 21,900 | Germany | Apr. 25, 1883 |
| 6,425 | Austria | Aug. 15, 1901 |
| 60,507 | Denmark | Dec. 28, 1942 |
| 246,591 | Switzerland | Oct. 1, 1947 |